US012673740B2

(12) United States Patent
Augustin et al.

(10) Patent No.: US 12,673,740 B2
(45) Date of Patent: Jul. 7, 2026

(54) ELECTRIC SMALL-SIZED VEHICLE

(71) Applicant: Bayerische Motoren Werke Aktiengesellschaft, Munich (DE)

(72) Inventors: Stephan Augustin, Munich (DE); Robert Bobinger, Huegelshart (DE); Jochen Karg, Oberpframmern (DE); Gerd Schuster, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 453 days.

(21) Appl. No.: 18/039,663

(22) PCT Filed: Nov. 2, 2021

(86) PCT No.: PCT/EP2021/080371
§ 371 (c)(1),
(2) Date: May 31, 2023

(87) PCT Pub. No.: WO2022/128229
PCT Pub. Date: Jun. 23, 2022

(65) Prior Publication Data
US 2024/0002008 A1      Jan. 4, 2024

(30) Foreign Application Priority Data
Dec. 16, 2020    (DE) ..................... 10 2020 133 679.9

(51) Int. Cl.
*B62K 15/00*          (2006.01)
*B62K 21/06*          (2006.01)

(52) U.S. Cl.
CPC ............ *B62K 15/008* (2013.01); *B62K 21/06* (2013.01); *B62K 2202/00* (2013.01)

(58) Field of Classification Search
CPC .... B62K 3/002; B62K 15/006; B62K 15/008; B62K 2200/00
See application file for complete search history.

(56) References Cited

U.S. PATENT DOCUMENTS

| | | | |
|---|---|---|---|
| 6,234,501 B1 * | 5/2001 | Chen ........................ | C23F 1/46 |
| | | | 280/87.041 |
| 10,850,783 B2 * | 12/2020 | Cordero ................. | B62K 25/20 |

(Continued)

FOREIGN PATENT DOCUMENTS

| | | | | |
|---|---|---|---|---|
| CH | 715806 A2 * | 8/2020 | ............. | B62K 25/02 |
| CN | 102282064 A | 12/2011 | | |

(Continued)

OTHER PUBLICATIONS

International Search Report (PCT/ISA/210) issued in PCT Application No. PCT/EP2021/080371 dated Feb. 7, 2022 with English translation (4 pages).

(Continued)

*Primary Examiner* — James A English
(74) *Attorney, Agent, or Firm* — Crowell & Moring LLP

(57) ABSTRACT

An electric small-sized vehicle, in particular an electric scooter, having a rear wheel, a frame, a support with a foot board and a wheel folding mechanism. The support includes a rear support section connected to the rear wheel, a front support section connected to the frame, and a receiving area for the rear wheel. The wheel folding mechanism has a first joint with a first pivot axis. The vehicle is adjustable from an unfolded position into a folded position via the joint. The front support section is connected to the rear support section by the first joint. In the unfolded position, the rear wheel is positioned in an outer position where the rear wheel is arranged outside of the receiving area, and in the folded position, the rear wheel is positioned in an inner position where the rear wheel is at least partly arranged within the receiving area.

12 Claims, 3 Drawing Sheets

(56)  References Cited

U.S. PATENT DOCUMENTS

| | | | |
|---|---|---|---|
| 2012/0013103 A1 | 1/2012 | Marion | |
| 2012/0256386 A1 | 10/2012 | Benarrouch | |
| 2015/0035257 A1* | 2/2015 | Zaid | B62D 31/006 |
| | | | 280/641 |
| 2015/0266536 A1* | 9/2015 | Yap | B62K 15/008 |
| | | | 180/181 |
| 2018/0086400 A1 | 3/2018 | Cordero | |

FOREIGN PATENT DOCUMENTS

| | | | | |
|---|---|---|---|---|
| CN | 104024098 A | | 9/2014 | |
| CN | 104349973 A | | 2/2015 | |
| CN | 106358442 A | | 1/2017 | |
| CN | 106184558 B | * | 11/2018 | B62K 21/16 |
| GB | 2477512 A | * | 8/2011 | B62K 15/006 |
| WO | WO 2015/140693 A1 | | 9/2015 | |

OTHER PUBLICATIONS

German-language Written Opinion (PCT/ISA/237) issued in PCT Application No. PCT/EP2021/080371 dated Feb. 7, 2022 (6 pages).
German-language Search Report issued in German Application No. 10 2020 133 679.9 dated Jul. 13, 2021 with partial English translation (11 pages).
Chinese-language Office Action issued in Chinese Application No. 202180073126.X dated Jun. 7, 2025 with English translation (12 pages).

* cited by examiner

ELECTRIC SMALL-SIZED VEHICLE

BACKGROUND AND SUMMARY

The invention relates to an electric personal transporter, in particular an electric scooter, with a steerable front wheel, a rear wheel, a frame which has a steering head for the front wheel, and a support with a foot board.

Electric personal transporters such as electric scooters or e-scooters are known. They have an electrical power system and are often used as vehicles for short distances such as "the last mile" or "the last kilometer".

Within the sense of the German regulations on electric personal transporters (eKFV), electric personal transporters are motor vehicles with an electrical power system and a maximum design speed of not less than 6 km/h and not more than 20 km/h which have, inter alia, the following features:

1. A vehicle with no seat or a self-balancing vehicle with or without a seat,
2. Handlebars for steering or holding of at least 500 mm for motor vehicles with a seat and of at least 700 mm for motor vehicles with no seat,
3. A continuous rated power of not more than 500 watts, or of not more than 1400 watts if at least 60 percent of the power is used for self-balancing,
4. A total width of not more than 700 mm, a total height of not more than 1400 mm, and a total length of not more than 2000 mm, and
5. A maximum vehicle mass (not including the driver) of not more than 55 kg.

Some electric personal transporters have a folding mechanism by means of which the electric personal transporter can be folded up compactly when not being used, for example for transporting it on public transport or to save storage space.

An object of the invention is to provide an electric personal transporter, with a folding mechanism, which can be folded up particularly compactly.

In order to achieve this object, an electric personal transporter, in particular an electric scooter or e-scooter, with a steerable front wheel, a rear wheel, a frame which has a steering head for the front wheel, a support with a foot board, and a wheel folding mechanism is provided. The support here has a rear support section which is connected to the rear wheel, and a front support section which is connected to the frame, and a slot for the rear wheel. The wheel folding mechanism has a first joint with a first pivot axis by means of which the electric personal transporter can be moved from an unfolded state into a folded-up state. Moreover, the front support section is connected to the rear support section by means of the first joint. The rear wheel is here positioned in the unfolded state in an outer position in which the rear wheel is arranged outside the slot, and in the folded-up state in an inner position in which the rear wheel is arranged at least partially inside the slot.

The rear wheel is thus arranged closer to the front wheel in the inner position than in the outer position.

It has been recognized that the size of the electric personal transporter can be effectively reduced by means of the wheel folding mechanism, as a result of which the electric personal transporter is particularly compact and transportable when in the folded-up state.

In particular, the distance between the front wheel and the rear wheel in the folded-up state is only 70% to 75% of the distance between the front wheel and the rear wheel in the unfolded state.

In one embodiment, the wheel folding mechanism has a second joint with a second pivot axis. The foot board is here connected to the front support section by means of the second joint. Moreover, the foot board can be moved by means of the second joint between a closed position in which the foot board provides a standing surface and at least partially covers and/or blocks the slot, and an open position in which the foot board frees up the slot to receive the rear wheel. The foot board is here in the closed position in the unfolded state of the electric personal transporter, and in the open position in the folded-up state of the electric personal transporter. In this way, the space which is provided in the unfolded state as a standing surface is used in order to provide space for the rear wheel in the folded-up state. The electric personal transporter can thus be folded up in a particularly compact fashion.

It is advantageous if the rear wheel can be pivoted by means of the first joint about the first pivot axis over a path which, in a vertical driving position of the electric personal transporter, is directed below, i.e. between the support and the road, in order to move the rear wheel from the outer position into the inner position.

The electric personal transporter can here have a limit stop which is designed such that, in the outer position, the rear wheel cannot be pivoted counter to the pivoting path, i.e. upward away from the road.

In a further embodiment, the rear support section encloses, in the folded-up state, a first angle and, in the unfolded state, a second angle relative to the front support section. The difference between the first and second angle is here between 150° and 210°, in particular 180°.

It can be provided that the rear wheel is mounted rotatably about an axis of rotation which runs parallel to the first pivot axis. The rear wheel is here mounted so that it can rotate freely about the axis of rotation in the inner position and projects downward beyond the support in a vertical pushing position of the electric personal transporter. The electric personal transporter can thus be pushed, in a vertical folded-up state, via the front wheel and rear wheel which here both roll over the ground. Both the front wheel and the rear wheel remain freely rotatable in this state such that the electric personal transporter can be pushed and does not need to be carried.

The electric personal transporter can here have a power system and be designed in such a way that the electric personal transporter can be powered in the folded-up state by means of the power system via the front wheel. In this way, electric pushing assistance can be provided preferably via a hub motor in the front wheel such that the electric personal transporter can be moved, for example, over ramps with electrical assistance at up to 6 km/h.

According to one embodiment, the electric personal transporter has a handlebar unit and a handlebar folding mechanism which has a third joint with a third pivot axis. The handlebar unit can here be pivoted about the third pivot axis by means of the third joint between a driving position and a transport position.

The third pivot axis here preferably runs through a steering head bearing of the steering head, as a result of which the electric personal transporter can be folded up in a particularly space-saving manner.

Additionally or alternatively, the handlebar unit can be shaped in such a way that, in a transportable state of the electric personal transporter in which the rear wheel is in the inner position and the handlebar unit is in the transport position, a straight line which runs parallel to the first pivot axis intersects the rear wheel and the handlebar unit. In other words, the handlebar unit is designed such that, in the transport position, it runs partially next to the rear wheel, for example by the handlebar unit being curved appropriately or having a recess for the rear wheel.

Further advantages and features can be found in the following description and in the attached drawings.

DETAILED DESCRIPTION

Figure 1:
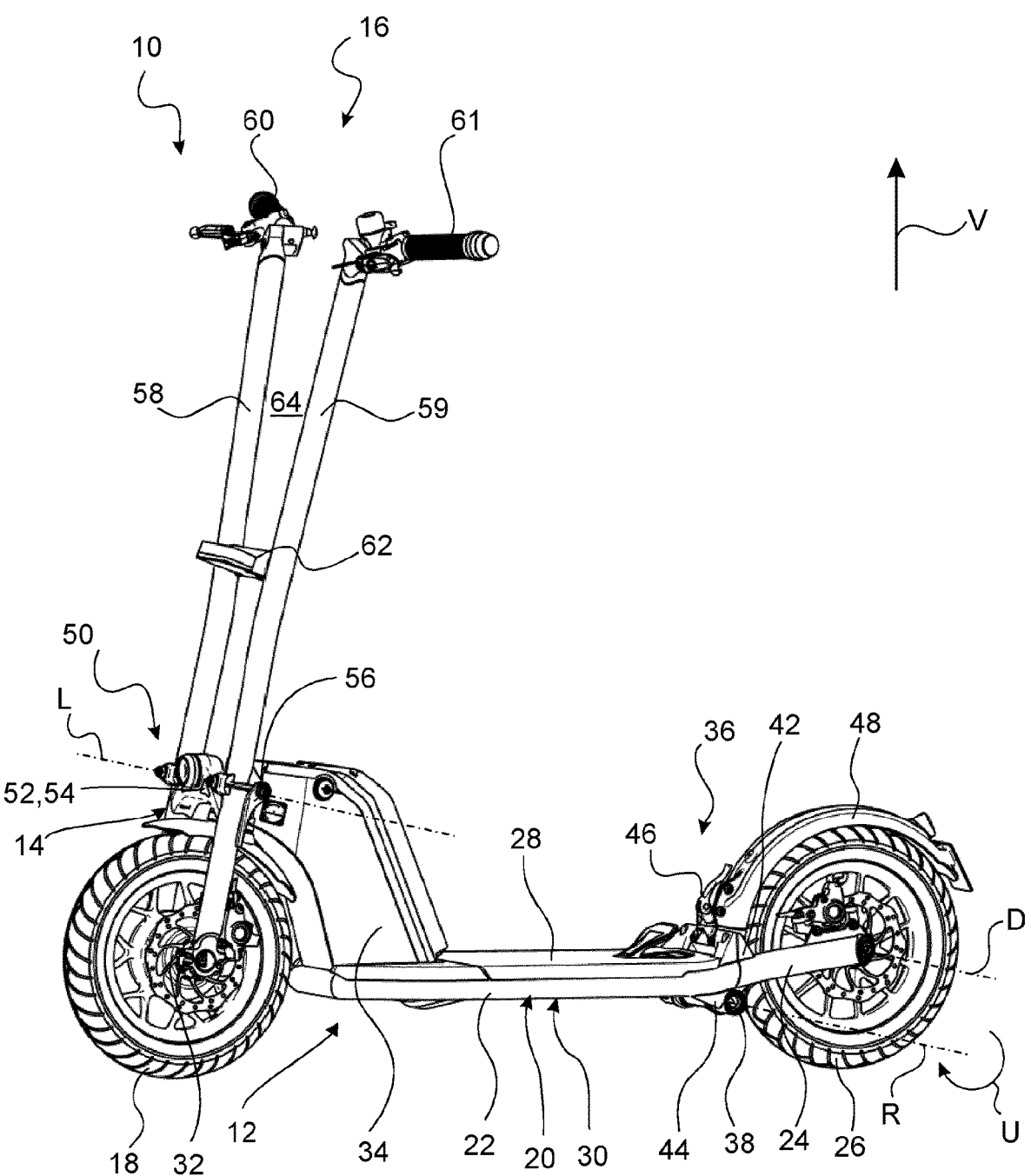
FIG. 1 shows in a schematic side view an electric personal transporter according to the invention in a ready-to-drive state.

An electric personal transporter 10 is shown in FIG. 1 in a ready-to-drive state and in a position in which it stands upright in a vertical direction V.

In the embodiment illustrated, the electric personal transporter 10 is an electric scooter which is also called an e-scooter.

The electric personal transporter 10 has a frame 12 with a steering head 14, a handlebar unit 16, and a front wheel 18 which is mounted so that it can be rotated by means of the handlebar unit 16 in the steering head 14 and which can be moved between different steering positions via the handlebar unit 16.

Moreover, the electric personal transporter 10 has a support 20 which has a front support section 22 and a rear support section 24, as well as a rear wheel 26 which is mounted so that it can rotate about an axis of rotation D on the rear support section 24.

The support 20 here has a foot board 28 and a slot 30 which is covered by the foot board 28 in the ready-to-drive state.

The power system of the electric personal transporter 10 is an electric hub motor 32 in the front wheel 18 and an electrical power unit 34, coupled to the hub motor 32, which is attached to the frame 12 and can be controlled or actuated via the handlebar unit 16.

Figure 2:
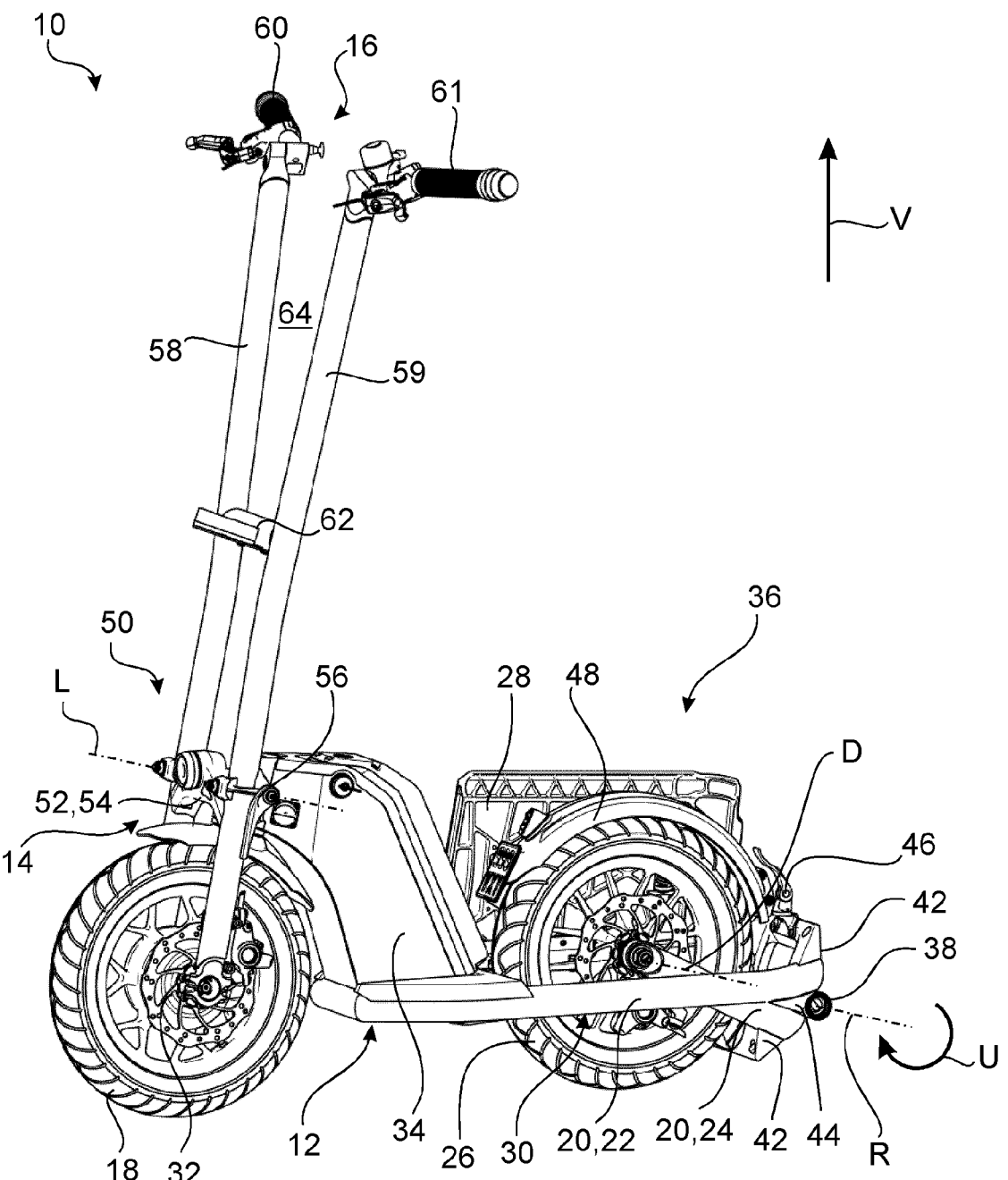
FIG. 2 shows in a schematic side view the electric personal transporter from FIG. 1 in a pushing state.
Figure 3:
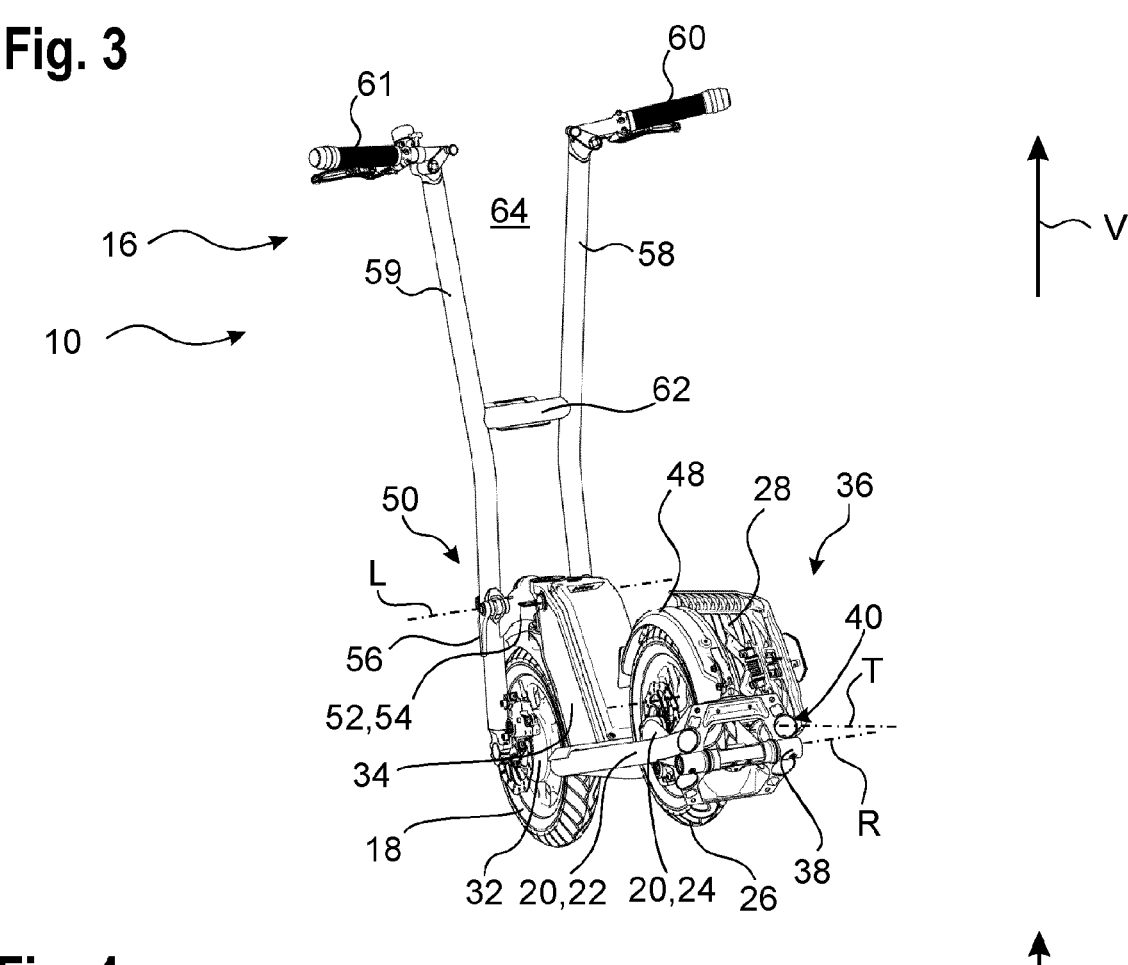
FIG. 3 shows in a perspective illustration the electric personal transporter from FIG. 1 in the pushing state.
Figure 4:
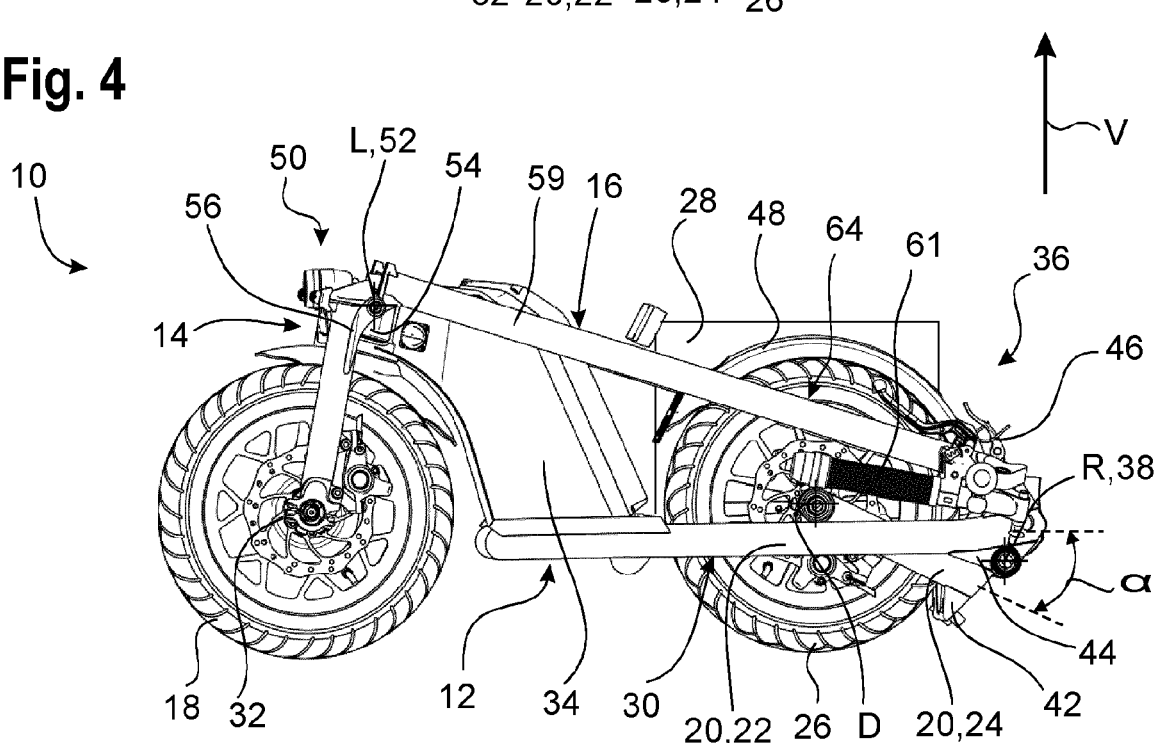
FIG. 4 shows in a schematic side view the electric personal transporter from FIG. 1 in a transportable state.

The electric personal transporter 10 moreover has a wheel folding mechanism 36 by means of which the electric personal transporter 10 can be moved between an unfolded state which includes the ready-to-drive state (see FIG. 1) of the electric personal transporter 10 and a folded-up state which includes a pushing state (see FIGS. 2 and 3) and a transportable state (see FIG. 4) of the electric personal transporter 10.

For this purpose, the wheel folding mechanism 36 has a first joint 38 with a first pivot axis R by means of which the front support section 22 is connected to the rear support section 24 so that it can pivot about the first pivot axis R, as well as a second joint 40 (see FIG. 3) with a second pivot axis T by means of which the foot board 28 is connected to the front support section 22 so that it can pivot about the second pivot axis T.

The foot board 28 can thus be moved by means of the second joint 40 between a closed position (see FIG. 1), in which the foot board 28 is oriented essentially horizontally and provides a standing surface, and an open position (see FIGS. 2 to 4), in which the foot board 28 is oriented essentially vertically and frees up, i.e. no longer covers, the slot 30.

In the embodiment illustrated, the foot board 28 is designed as a single piece.

Alternatively, the foot board 28 can be designed with multiple pieces, for example bisected longitudinally. In this case, a plurality of joints are correspondingly provided in order to move the foot board parts which cover the slot 30 between the closed position and the open position.

The rear wheel 26 can be moved by means of the first joint 38 between an outer position (see FIG. 1) in which the rear wheel 26 is arranged outside the slot 30 and an inner position (see FIGS. 2 to 4) in which the rear wheel 26 is accommodated in the slot 30.

In order to move the electric personal transporter 10 from the unfolded state into the folded-up position, the foot board 28 is first moved from the closed position into the open position, i.e. folded upward to one side, and the rear wheel 26 is then pivoted along a pivoting path U from the outer position into the slot 30 and hence moved into the inner position.

The first pivot axis R is here arranged directly in front of the rear wheel 26, as a result of which the electric personal transporter 10 is particularly compact in its longitudinal extent.

The rear wheel 26 is thus pivoted along the pivoting path U by an angle which corresponds to the angle α (see FIG. 4) of 25° plus 180°, i.e. by a total of 205°.

In principle, the angular difference between the outer position and the inner position can be of any desired size. The angular difference is, however, preferably between 150° and 210°, in particular 180°.

The pivoting path U in which the rear wheel 26 pivots from the outer position into the inner position here runs firstly downward in the direction of the road or the ground.

The first pivot axis R here runs parallel to the axis of rotation D, as a result of which the rear wheel 26 is oriented in the primary driving direction of the electric personal transporter 10 in all pivoted positions.

As a result, the rear wheel 26 also rolls optimally in the inner position such that in the pushing state the electric personal transporter 10 can be pushed or powered in the primary driving direction with little resistance.

For this purpose, the electric personal transporter 10 is designed such that the rear wheel 26 projects in the inner position downward beyond the support 20 counter to the vertical direction V such that the electric personal transporter 10 stands in an upright position on the front wheel 18 and the rear wheel 26.

An outer limit stop 42, which prevents the rear wheel 26 in the outer position from being able to pivot further than the pivoting path U, i.e. upward, is moreover attached on the support 20.

An inner limit stop 44, which prevents the rear wheel 26 in the inner position from being able to pivot further than the pivoting path U, i.e. upward, is furthermore attached on the support 20.

In this way, the rear wheel 26 is held in a defined position during driving in the outer position and in the pushing state in the inner position by virtue of the acting force of gravity of the electric personal transporter 10 itself or of a driver.

The wheel folding mechanism 36 moreover has a locking mechanism 46 by means of which the wheel folding mechanism 36 can be locked and released.

The locking mechanism 46 is here a quick-release.

Additionally or alternatively, the wheel folding mechanism 36 can have one or more magnets, for example on the outer and/or inner limit stop 42, 44 which hold the rear wheel 26 in the outer position or inner position.

In the embodiment illustrated, the electric personal transporter 10 has a mudguard 48 for the rear wheel 26 which is attached movably on the front support section 22 and consequently its orientation can be adapted to the outer position and the inner position of the rear wheel 26.

The mudguard 48 can here be coupled to the locking mechanism 46 in such a way that the mudguard 48 is simultaneously released or fixed in its orientation with the release or locking of the wheel folding mechanism 36.

In order to move the electric personal transporter 10 from the pushing state (see FIGS. 2 and 3) into the transportable state (see FIG. 4), the electric personal transporter 10 has a handlebar folding mechanism 50.

The handlebar folding mechanism 50 has a third joint 52 with a third pivot axis L by means of which the handlebar unit 16 can be pivoted about the third pivot axis L between a driving position (FIGS. 1 to 3) in which the handlebar unit 16 is oriented essentially vertically and is available for steering the electric personal transporter 10 in the ready-to-drive state of the electric personal transporter 10 and a transport position (see FIG. 4) in which the handlebar unit 16 is oriented essentially horizontally in the transportable state of the electric personal transporter 10.

The third pivot axis L extends here through a steering head bearing 54 of the steering head 14 via which the steering head 14 is connected to the frame 12.

The handlebar folding mechanism 50 has a locking device 56 by means of which the handlebar mechanism 50 can be locked and released.

The handlebar folding mechanism 50 is here a quick-release.

In the embodiment illustrated, the handlebar unit 16 has two bars 58, 59 with in each case a handlebar end 60, 61 angled with respect to the respective bar, as well as a crossbar 62 which interconnects the two bars 58, 59.

The handlebar unit 16 has an opening 64 between the two bars 58, 59 which the rear wheel 26 enters in the inner position when the handlebar unit 16 is moved from the driving position into the transport position and the electric personal transporter 10 is hereby moved from the pushing state into the transportable state. The bars 58, 59 thus extend in the transportable state laterally from the rear wheel 26 and the rear wheel 26 is arranged in the opening between the two bars 58, 59 in the transportable state.

The handlebar ends 60, 61 cannot be folded, as a result of which the electric personal transporter 10 is even more compact in the transportable state.

In an alternative embodiment, the handlebar unit 16 can have any desired design, for example with a single bar.

In all cases, however, the handlebar unit 16 is preferably designed such that it has an opening 64 for the rear wheel 26 or frees up said opening, for example by the bar or bars being shaped appropriately.

Additionally or alternatively, the handlebar unit 16 can have a telescopic function by means of which the height of the handlebar unit 16 can be adjusted.

Moreover, the electric personal transporter 10 can, in a further embodiment, have a luggage holder with a hook on which a piece of luggage can be hung, and two retaining wings which laterally delimit a luggage space which is arranged below the hook and thus reliably retain the piece of luggage in the luggage space when driving.

The hook is here attached, for example, on the crossbar 62, whilst the retaining wings are fastened on the two bars 58, 59.

In this way, an electric personal transporter 10 with three functional states is provided:

In the ready-to-drive state in which the foot board 28 is in the closed position, the rear wheel 26 is in the outer position, and the handlebar unit 16 is in the driving position, the electric personal transporter 10 can be driven by a driver standing with one or both feet on the foot board 28.

In the pushing state in which the foot board 28 is in the open position, the rear wheel 26 is in the inner position, and the handlebar unit 16 is in the driving position, the electric personal transporter 10 can be pushed comfortably via the handlebar unit 16 by a driver who is standing up, wherein the electric personal transporter 10 is more compact than in the ready-to-drive state.

In the transportable state in which the foot board 28 is in the open position, the rear wheel 26 is in the inner position, and the handlebar unit 16 is in the transporting position, the electric personal transporter 10 takes up the least amount of space and can thus be transported or stored particularly easily.

The invention is not restricted to the embodiment shown and in particular individual features of one embodiment can be combined as desired with features of other embodiments, in particular independently of the other features of the corresponding embodiments.

The invention claimed is:

1. An electric personal transporter comprising:
   a steerable front wheel;
   a rear wheel;
   a frame, a steering head for the front wheel, a support with a foot board, and a wheel folding mechanism,
   wherein the support comprises a rear support section to which the rear wheel is mounted, a front support section attached to the frame, and a slot for the rear wheel,
   wherein the wheel folding mechanism comprises a first joint with a first pivot axis by which the electric personal transporter is configured to be moved from an unfolded state into a folded-up state,
   wherein the front support section is connected to the rear support section by the first joint,
   wherein the rear wheel is positioned in the unfolded state in an outer position in which the rear wheel is arranged outside the slot, and in the folded-up state in an inner position in which the rear wheel is arranged at least partially inside the slot, and
   wherein the first pivot axis is arranged directly in front of the rear wheel such that, in a vertical driving position of the electric personal transporter, a pivoting path of the rear wheel from the outer position into the inner position runs below the support and above a road.

2. The electric personal transporter according to claim 1, wherein the wheel folding mechanism comprises a second joint with a second pivot axis,
   wherein the foot board is connected to the front support section by the second joint,
   wherein the foot board is configured to be moved via the second joint between a closed position in which the foot board provides a standing surface and at least partially covers and/or blocks the slot, and an open position in which the foot board frees the slot to receive the rear wheel, and
   wherein the foot board is configured to be in the closed position in the unfolded state of the electric personal transporter, and in the open position in the folded-up state of the electric personal transporter.

3. The electric personal transporter according to claim 1, wherein the rear wheel is configured to be pivoted via the first joint about the first pivot axis in a pivoting path which, in a vertical driving position of the electric personal transporter, is below the support and above the road, in order to move the rear wheel from the outer position into the inner position.

4. The electric personal transporter according to claim 3, comprising:
a limit stop configured such that, in the outer position, the rear wheel cannot be pivoted further than the pivoting path.

5. The electric personal transporter according to claim 1, wherein, when in the folded-up state, the rear support section is at a first angle relative to the front support section, and, when in the unfolded state, the rear support section is at a second angle relative to the front support section, wherein a difference between the first angle and second angle is between 150° and 210°.

6. The electric personal transporter according to claim 5, wherein the difference between the first angle and second angle is 180°.

7. The electric personal transporter according to claim 1, wherein the rear wheel is mounted rotatably about an axis of rotation which runs parallel to the first pivot axis, wherein the rear wheel is mounted so that it can rotate about the axis of rotation in the inner position and projects downward beyond the support in a vertical pushing position of the electric personal transporter.

8. The electric personal transporter according to claim 1, comprising:
a power system,
wherein electric personal transporter is configured such that the electric personal transporter can be powered to move the electric personal transporter while in the folded-up state by the power system via the front wheel.

9. The electric personal transporter according to claim 1, comprising:
a handlebar unit; and
a handlebar folding mechanism,
wherein the handlebar folding mechanism comprises a third joint with a third pivot axis,
wherein the handlebar unit is configured to be pivoted about the third pivot axis via the third joint between a driving position and a transport position.

10. The electric personal transporter according to claim 9, wherein the third pivot axis runs through a steering head bearing of a steering head.

11. The electric personal transporter according to claim 9, wherein the handlebar unit is shaped in such a way that, in a transportable state of the electric personal transporter in which the rear wheel is in the inner position and the handlebar unit is in the transport position, a straight line which runs parallel to the first pivot axis intersects the rear wheel and the handlebar unit.

12. The electric personal transporter according to claim 1, wherein the electric personal transporter is an electric scooter.

* * * * *